(12) United States Patent
Beatty et al.

(10) Patent No.: US 8,666,944 B2
(45) Date of Patent: Mar. 4, 2014

(54) METHOD AND SYSTEM OF PERFORMING A GRANULAR RESTORE OF A DATABASE FROM A DIFFERENTIAL BACKUP

(75) Inventors: Louis Beatty, Ormond, FL (US); Deepak Saraf, Windermere, FL (US)

(73) Assignee: Symantec Corporation, Mountain View, CA (US)

( * ) Notice: Subject to any disclaimer, the term of this patent is extended or adjusted under 35 U.S.C. 154(b) by 294 days.

(21) Appl. No.: 12/893,729

(22) Filed: Sep. 29, 2010

(65) Prior Publication Data

US 2012/0078855 A1 Mar. 29, 2012

(51) Int. Cl.
*G06F 17/30* (2006.01)

(52) U.S. Cl.
USPC ...................................................... 707/679

(58) Field of Classification Search
USPC ...................................................... 707/679
See application file for complete search history.

(56) References Cited

U.S. PATENT DOCUMENTS

| | | | |
|---|---|---|---|
| 5,150,473 | A | 9/1992 | Zulch |
| 5,966,730 | A | 10/1999 | Zulch |
| 6,269,381 | B1 | 7/2001 | St. Pierre et al. |
| 6,330,570 | B1 | 12/2001 | Crighton |
| 6,470,329 | B1 | 10/2002 | Livschitz |
| 6,523,036 | B1 | 2/2003 | Hickman et al. |
| 6,571,285 | B1 | 5/2003 | Groath et al. |
| 7,085,904 | B2 | 8/2006 | Mizuno et al. |
| 7,107,486 | B2 | 9/2006 | Okada et al. |
| 7,146,476 | B2 * | 12/2006 | Sandorfi et al. ............. 711/162 |
| 7,302,536 | B2 | 11/2007 | Watanabe |
| 7,370,164 | B1 | 5/2008 | Nagarkar et al. |
| 7,627,727 | B1 | 12/2009 | Kekre |
| 7,634,511 | B1 | 12/2009 | Freiheit et al. |
| 7,669,020 | B1 | 2/2010 | Shah |
| 7,694,088 | B1 | 4/2010 | Bromley et al. |
| 7,694,105 | B2 | 4/2010 | Sanvido |
| 7,797,279 | B1 * | 9/2010 | Starling et al. ............. 707/641 |
| 8,099,391 | B1 | 1/2012 | Monckton |
| 2002/0059505 | A1 * | 5/2002 | St. Pierre et al. ............. 711/162 |
| 2003/0163495 | A1 | 8/2003 | Lanzatella et al. |

(Continued)

FOREIGN PATENT DOCUMENTS

| | | |
|---|---|---|
| EP | 1640868 | 3/2006 |
| WO | WO 2007/002397 | 1/2007 |

OTHER PUBLICATIONS

SharePoint Microsoft: Sharepoint advantages, Mar. 9, 2009. pp. 1-2.*
Groff, Introduction to SQL, 2004, pp. 1-2.*

(Continued)

*Primary Examiner* — Albert Phillips, III
(74) *Attorney, Agent, or Firm* — Rory D. Rankin; Meyertons, Hood, Kivlin, Kowert & Goetzel, P.C.

(57) ABSTRACT

A system and method for performing a granular restore operation of a database from a differential backup of the database. A bitmask is created during a differential backup and stored with the differential backup file. When a user requests a granular restore operation, views of how the database existed at different points of time may be presented to the user. The objects the user wishes to restore may be selected from one of the views. Next, the bitmask may be read to determine if the objects should be retrieved from the differential backup file or a full backup file. Finally, the objects may be restored to the database from the proper file.

20 Claims, 7 Drawing Sheets

(56) References Cited

U.S. PATENT DOCUMENTS

| | | | |
|---|---|---|---|
| 2003/0172094 A1 | 9/2003 | Lauria et al. | |
| 2004/0193953 A1 | 9/2004 | Callahan et al. | |
| 2004/0215619 A1 | 10/2004 | Rabold | |
| 2004/0235523 A1 | 11/2004 | Schrire et al. | |
| 2004/0260873 A1 | 12/2004 | Watanabe | |
| 2004/0260973 A1 | 12/2004 | Michelman | |
| 2004/0268068 A1 | 12/2004 | Curran | |
| 2005/0165868 A1 | 7/2005 | Prakash | |
| 2005/0240813 A1 | 10/2005 | Okada et al. | |
| 2007/0168401 A1 | 7/2007 | Kapoor et al. | |
| 2008/0133622 A1* | 6/2008 | Brown et al. | 707/204 |
| 2009/0006499 A1* | 1/2009 | Mukhi et al. | 707/204 |
| 2009/0313447 A1 | 12/2009 | Nguyen et al. | |
| 2010/0011178 A1 | 1/2010 | Feathergill | |
| 2010/0049750 A1 | 2/2010 | Srivastava | |
| 2010/0082553 A1 | 4/2010 | Beatty et al. | |
| 2010/0083251 A1 | 4/2010 | McCrory | |

OTHER PUBLICATIONS

International Search Report and Written Opinion International Application No. PCT/US2011/053809 mailed Jan. 12, 2012.

Dantz Development Corporation, "Retrospect User's Guide", Apr. 8, 2003, Version 6.5, p. 2, 5, 10, 24-25, 37, 43, 53, 67, 79-80, 108, 129, 130, 133, 149, 204, 211, 221 and 235.

Fifth Generation Systems "Fastback Plus: The World's best selling most reliable backup software", Dec. 31, 1993, for DOS User's Guide, p. 10 and p. 129.

Woodcock, et al.; Microsoft Computer Dictionary, Dec. 31, 1999, Microsoft Press, 4th Ed., p. 58.

Dantz Development Corporation, "Retrospect User's Guide", Apr. 8, 2003, Version 6.5, p. 84, 106, 132 and 133.

Carol, "User Guide Laplink Gold 11.0: The Standard in Remote Control and File Transfer", Sep. 2001, LapLink Inc., p. 2-160.

"Windows DDK Glossary," http://msdn.microsoft.com/library/default.asp?url=/library/en-us/gloss/hh/gloss/glossary_628b1dfc-c8f0-4143-a4ef-0dddae24be4b.xml.asp (3 pages).

"Repliweb R-1 User Guide—Version 3.1," RepliWeb, Inc., 2002, (27 pages).

"FilesX Xchange RestoreTM for Microsoft Exchange Server," FilesX, Inc., Aug. 2003, (2 pages).

"Instructor Articles," VERITAS Education, pp. 1-7, Apr. 2003.

"EMC TimeFinder Family," EMC Corporation, 8 pages, Oct. 2004.

"EMC TimeFinder Local Replication," EMC Corporation, 2 pages, Oct. 2004.

"Storage Area Networking—High-Speed Data Sharing Among Multiple Computer Platforms", Tivoli Systems, Inc., Copyright 2000. ftp://ftp.software.ibm.com/software/tivoli/whitepapers/san_datasharing_wp.pdf, (2000), 4 pages.

"Storage Management—Best Practices", Copyright 2001, IBM Corp., ftp://ftp.software.ibm.com/software/tivoli/whitepapers/wp-storage-bp.pdf, (2001), 11 pages.

Amiri, Khalil S., "Scalable and manageable storage systems", Ph.D. Thesis, Dept. of Electrical and Computer Engineering, Carnegie Mellon University, Pittsburgh, PA, http://www.pdl.cmu.edu/PDL-FTP/NASD/amiri_thesis.pdf, (Dec. 2000), i-241 pgs.

Wylie, Jay J., et al., "Selecting the Right Data Distribution Scheme for a Survivable Storage System", Research Paper, School of Computer Science, Carnegie Mellon University, Pittsburgh, PA, http://www.pdl.cmu.edu/PDL-FTP/Storage/CMU-CS-01-120.pdf, May 2001), pp. 1-21.

Nakamura, et al., "Optimal Backup Policy for a Database System with Incremental and Full Backups", Mathematical and Computer Modeling vol. 38, Issues 11-13, Dec. 2003, pp. 1373-1379.

* cited by examiner

US 8,666,944 B2

METHOD AND SYSTEM OF PERFORMING A GRANULAR RESTORE OF A DATABASE FROM A DIFFERENTIAL BACKUP

BACKGROUND OF THE INVENTION

1. Field of the Invention

The present invention relates generally to database backups, and in particular to performing a granular restore of a database from a differential backup.

2. Description of the Related Art

Database backup and recovery are challenging processes that become more difficult as a company's database grows and as the demands on its online availability increases, limiting the time available for backup and recovery operations. A database, such as a Microsoft® Structured Query Language (SQL) database, is often backed up as a single, monolithic database file, which contains all the tables, records, and indexing information for the database. However, backing up the entire database may consume large amounts of storage memory, processing cycles, and network bandwidth.

Instead of backing up the entire database, a differential backup may be performed to reduce database downtime and the amount of data being sent over the network and stored within the backup storage medium. A full backup of the database is performed at least once prior to doing a differential backup. After a full backup, subsequent backups can be differential backups. A differential backup may contain only the changes made to the database since the last full backup. This is an efficient approach to backing up databases, because databases are often backed up on a regular schedule, and typically only a small amount of data in the database will change between consecutive backups.

Once a backup of the database has been stored, a user may wish to restore the database or one or more items from the database on an as-needed basis. If a user needs to restore the entire database, then the entire database may be restored to the server hosting the database. However, when a user only wants to restore a few objects to the database, unless proper mechanisms are in place to allow for a granular restore, the entire database may need to be restored.

After performing a differential backup, the data stored in the backup storage medium will be split between the differential backup and the last full backup, and determining which of these two backups to pull data from when performing a granular restore can be a slow and inefficient process. One technique currently used requires restoring the entire full backup and then playing back the changes from the differential backup. This is an inefficient and slow technique when only a few items of the database need to be restored.

In view of the above, improved methods and mechanisms for performing a granular restoration of database items from a differential backup are desired.

SUMMARY OF THE INVENTION

Various embodiments of methods and mechanisms for performing a granular restore operation of a database from a differential backup of the database are contemplated. In one embodiment, when a differential backup of a database is performed, a bitmask may be created and stored with the differential backup file. When a granular restore operation is requested by a user, the database as it existed at a specific point in time may be presented to the user by logically merging the differential backup file with the full backup file. Next, the user may select objects to restore to the database from a user interface. The bitmask may be loaded into memory and read to determine where the selected items reside: in the differential backup file or in the full backup file. The items may then be retrieved from the correct location and restored to the database.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Figure 1:
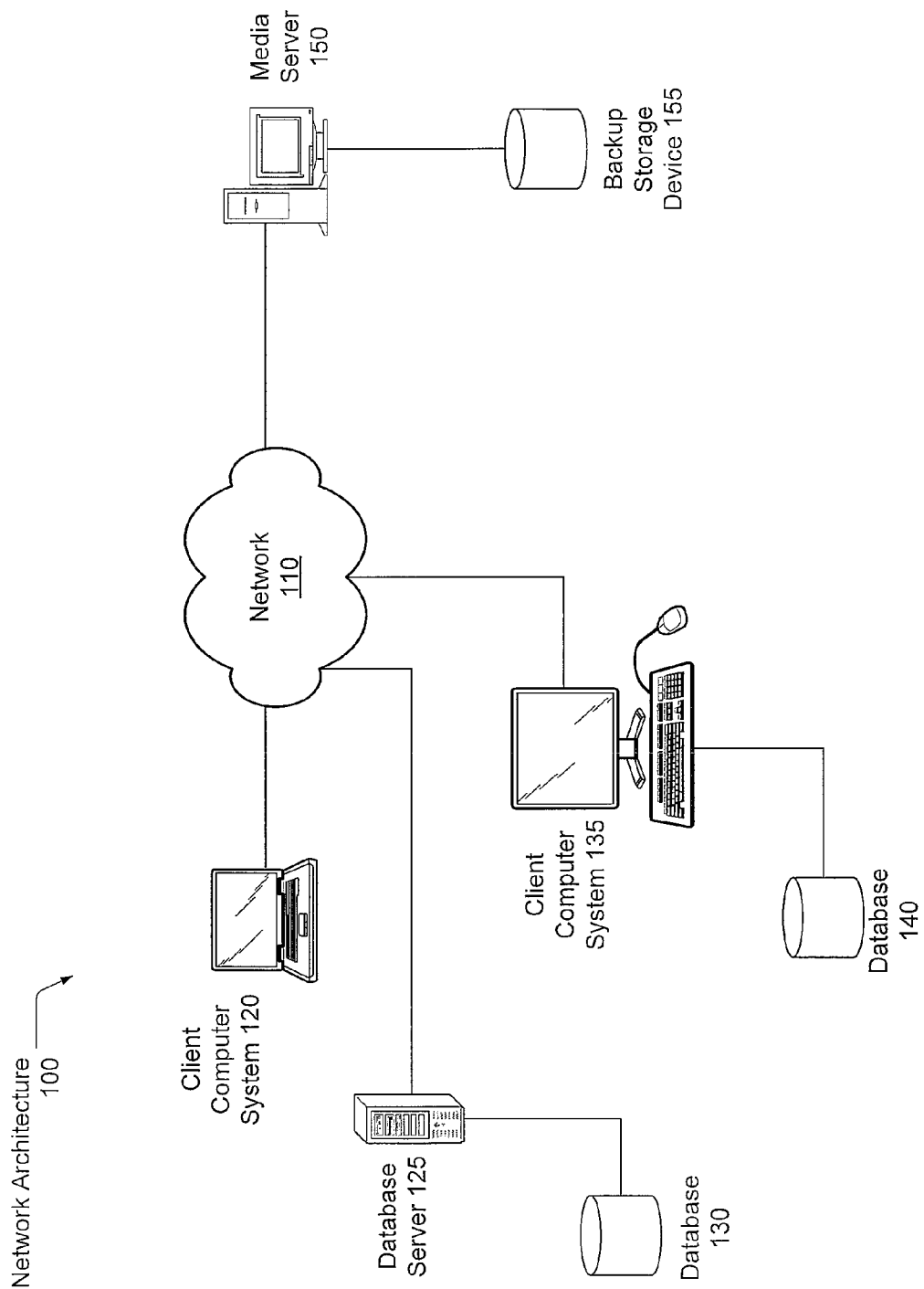
FIG. 1 is a diagram that illustrates a network architecture in accordance with one or more embodiments.

Referring to FIG. 1, one embodiment of a network architecture 100 is shown. Media server 150 is connected to client computer system 120, client computer system 135, and database server 125 through network 110. Media server 150 may include at least a single processor or central processing unit, other system hardware, and a storage medium for storing software applications. Media server 150 may also include an operating system, and the operating system may be any of various types, including MS-DOS®, MS-WINDOWS®, OS/2®, UNIX®, Linux®, Solaris® or another known operating system. The operating system may interface between the system hardware and the software applications.

Media server 150 may host one or more software applications to perform backup and restore operations of databases 130 and 140. Media server 150 may store the backups of databases 130 and 140 in backup storage device 155. The backups of databases 130 and 140 may be full backups and/or differential backups. A differential backup of a database may contain all of the changes made to the database since the last full backup. Other types of backups of databases 130 and 140 may also be stored in backup storage device 155, including incremental backups, transaction logs, and others. Also, media server 150 may perform granular restore operations to restore data objects from backup storage device 155 to databases 130 and 140.

Backup storage device 155 may include or be further coupled to several varieties of storage consisting of one or more hard disks, tape drives, server blades, or specialized devices, and may include a variety of memory devices such as RAM, Flash RAM, MEMS (Micro Electro Mechanical Systems) storage, battery-backed RAM, and/or non-volatile RAM (NVRAM), etc. In another embodiment, the media server 150 may instead store the backups on another device, such as another storage medium, another computer system, or another server (not shown) connected over the network 110.

Network 110 may comprise a variety of network connections including combinations of local area networks (LANs), such as Ethernet networks, Fiber Distributed Data Interface (FDDI) networks, token ring networks, and wireless local area networks (WLANs) based on the Institute of Electrical and Electronics Engineers (IEEE) 802.11 standards (Wi-Fi), and wide area networks (WANs), such as the Internet, cellular data networks, and other data communication networks.

In various embodiments of network architecture 100, client computer systems 120 and 135 are representative of any number of stationary or mobile computers such as servers, desktop PCs, laptops, handheld computers, smartphones, etc. Clients 120 and 135 may include at least a single processor or central processing unit, other system hardware, and a storage medium for storing software applications. In some embodiments, clients 120 and 135 may include an operating system of the various types listed above. The operating system may interface between the system hardware and the software applications.

Client 120 and/or client 135 may host an intranet portal application. The intranet portal application may be operable to manage and maintain a plurality of web pages and electronic documents that make up a web site for a plurality of system users. The web site data may be stored in database 130 and/or in database 140. In one embodiment, the intranet portal application may be a Microsoft® SharePoint® Server or a similar enterprise information portal program. In another embodiment, the intranet portal application may comprise other web site development software. A database backup for the intranet portal application may be performed that stores a copy of a web site on backup storage device 155. The web site information may include tables, records, lists of items, corresponding globally unique identifiers, and other data used to present a view of web pages within the site to a user.

The intranet portal application may also include an encapsulated version of a database for storing lists, items, and records. In one embodiment, the intranet portal application may be configured to be the 'user' of a database. In another embodiment, a Microsoft® SQL server, a Microsoft Sharepoint server, or other database server system embodies a database. It is further noted that one or more other client computers may be coupled via a network to client 120 or client 135 allowing the client systems to access the intranet portal application centrally via one or more web pages, including access to the database.

Databases 130 and 140 may be representative of any number and types of databases connected to network 110. Database server 125 is coupled to database 130, and database 130 may be accessed via database server 125. Client computer system 135 is coupled to database 140, and database 140 may be accessed through client 135. Databases 130 and 140 may represent both a database program and/or one or more actual databases implemented therein. The database program refers to the executable commands, user interfaces and other program code for operating the database. The included databases may further comprise various tables, indexes, relationships, queries, stored procedures, file systems, security layers, networking interfaces, etc., which are configured to operate on a plurality of data records.

In one embodiment in which databases 130 and 140 are relational databases, the records may be arranged in tables (row and column arrangement). The term "record" as used herein shall refer to an entry in a database. A collection of associated records may be collectively described as a "table" in the database. A record may consist of one or more fields, which may serve as indexes (or keys) to other records in other tables. For example, in a document management database, each record in a document table may represent a document stored in the database. In one embodiment, the document may be stored in the fields of the record itself. In some embodiments, the document may be represented in a record by a reference to the document, such as a memory location. In addition, the database may create and modify a mounted database file for storing and accessing any given implementation of a relational database. In some embodiments, databases 130 and 140 may execute on a dedicated computing system, such as database server 125 or client 135, that is configured for access by other server and client computers via a communications network.

Databases 130 and 140 may include various kinds of functions associated with a relational database, such as add and query procedures. The query function may retrieve information from the database, such as a change map, allocation maps, objects, tables, records, and other data. The add function may store information in the database. Databases 130 and 140 may be a Microsoft SQL Server databases and the interfaces used to provide access to databases 130 and 140 may use SQL. Data may be stored and retrieved from a Microsoft SQL Server at a page level. Each page may have a size of 8 kilobytes (KB) and may consist of a header and data. The page header may contain an object ID to which the data in the page belongs. Server input/output (I/O) operations may be performed at the page level, such that an SQL Server reads or writes whole pages.

In one embodiment, a change map may be a differential changed map (DCM) stored in a Microsoft SQL Server database. The DCM may track the extents that have changed since the last full database backup. Extents may be a collection of eight physically contiguous pages and may be used to efficiently manage pages. The DCM may be a bitmap where each bit represents a single extent. The bitmap may be organized such that if the bit for an extent is 1, then the extent has been modified since the last full backup and if the bit for an extent is 0, then the extent has not been modified. In some embodiments, the Microsoft SQL server may read the DCM pages to determine which extents have been modified. Then, the server may send over those extents that have been modified as part of a differential backup to media server 150.

Media server 150 may execute a query to retrieve the pages that make up the DCM from mounted database 130 and/or mounted database 140. As used herein, a "mounted database" refers to a database that is loaded and accessible to authorized users of a server or client computer. The first DCM page may be located at the $7^{th}$ page of a mounted database. The second DCM page may be located 512232 pages offset from the first DCM page, at the $512239^{th}$ page. The third page DCM page may be offset 1024464 pages from the first DCM page, at the 1022471th page, and so on. In one embodiment, media server 150 may store the retrieved DCM pages as a bitmask file.

Media server 150 may also execute a query to retrieve one or more allocation maps from mounted database 130 and/or mounted database 140. The allocation maps may contain information about the extents that an object or index uses. For example, the allocation maps may contain bitmasks of extents indicating which extents are in use for that object. In one embodiment, one of the allocation maps may be the index allocation map from a Microsoft SQL server database.

In other embodiments, the number and type of clients, database and media servers, and storage devices is not limited to those shown in FIG. 1. Almost any number and combination of servers, storage devices, and stationary and mobile clients may be interconnected in network architecture 100 via various combinations of modem banks, direct LAN connections, wireless connections, WAN links, etc. Also, at various times one or more clients may operate offline. In addition, during operation, individual client connection types may change as mobile users travel from place to place connecting, disconnecting, and reconnecting to network architecture 100.

Figure 2:
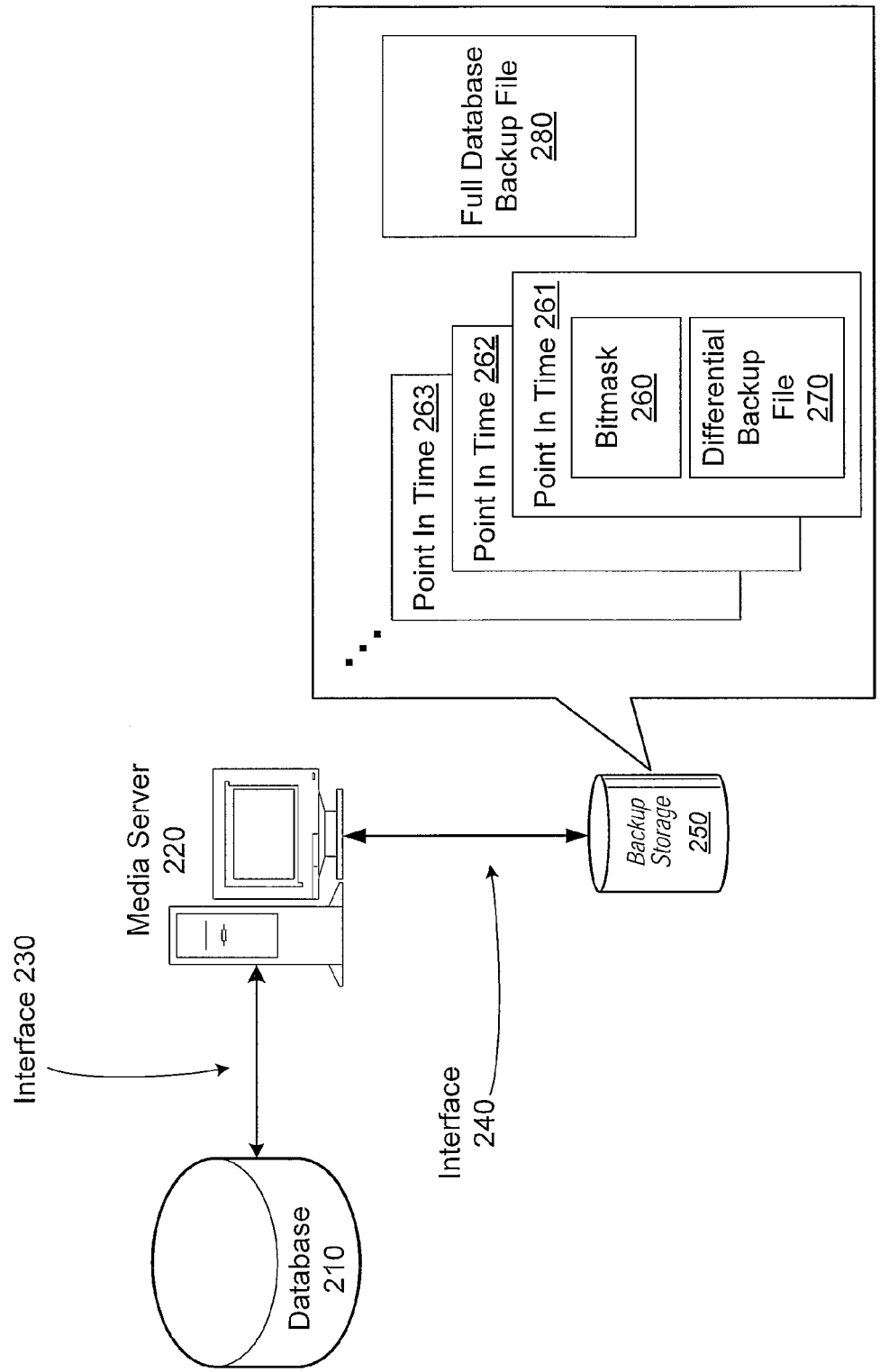
FIG. 2 illustrates one embodiment of a database archival system.

Referring to FIG. 2, a block diagram of one embodiment of a system for backing up and restoring data to a database is illustrated. On the left side, database 210 is shown. In one embodiment, database 210 may be an object-oriented database. In another embodiment, database 210 may be a secured relational database management system (RDBMS), such as a Microsoft SQL Server database. The RDBMS may be both a relational database program and one or more actual databases implemented therein. The relational database program refers to the executable commands, user interfaces and other program code for operating database 210. The plurality of databases included in database 210 may further include various tables, indexes, relationships, queries, stored procedures, file systems, security layers, networking interfaces, etc., which are configured to operate on a plurality of data records, also referred to as records or entries, that constitute the "database". The records may be arranged in tables in a row and column arrangement. In addition, database 210 may create and modify a mounted database file for storing and accessing any given implementation of a relational database.

Database 210 may be accessed by media server 220 via interface 230. Interface 230 may include a local or remote network interface, and may also include network and/or software driver layers for communicating with database 210. In one embodiment, interface 230 may provide access to database 210 using SQL.

Media server 220 may be configured to perform a backup of the contents of database 210. Media server 220 may store the backup of database 210 as a master data file (MDF). Media server 220 may also be configured to generate and store a schema of table and index information along with the backed up contents in the unmounted full database backup file 280. In one embodiment, schema may refer to the data structure of a database file. Schema may include memory locations that define certain data structures within the database file. Schema may be used to quickly and efficiently locate objects in the database file, without having to perform extensive searching operations. Schema may be generated by querying database 210 when a backup of the database is being created. The unmounted full database backup file 280 may be an identical instance of a mounted database file previously created by database 210. The schema may be used to access or restore the contents of the full database backup file 280 without using database 210.

Media server 220 may be operable to archive copies of objects and records from database 210 to backup storage 250. Backup storage 250 may be any of a variety of types of storage medium. Alternatively, selected objects and records may be transferred from database 210 to a remote archive storage through a network interface. In various embodiments, media server 220 may also restore objects, records, or other data acquired from previous archive operations to database 210. Media server 220 may also be configured to provide other known archiving functionality, as desired, such as various features provided by Backup Exec™ products from Symantec®. In one embodiment, media server 220 may contain backup system agent software. A backup system agent may be a software routine that waits for a detection of a predetermined event and performs one or more actions when such detection occurs. A backup system agent may be software configured to perform one or more backup and restore functions.

Media server 220 may access backup storage 250 via interface 240 for selecting and retrieving content for archiving. Interface 240 may represent file access by media server 220 to a file system residing on backup storage 250. In one embodiment, interface 240 may include a network connection to a remote storage medium. In another embodiment, interface 240 may represent storage access to a storage area network (SAN), which may be a distributed, shared storage environment.

Media server 220 may receive data identifying the changes made to the database 210 during a differential backup operation and store the changes in the differential backup file 270. Media server 220 may also build a bitmask 260 to indicate which objects or records of database 210 have changed and should be retrieved from differential backup file 270 during a restore operation. The objects may include binary objects of various sizes, tables, records, data stored in the fields of the records, documents, items, lists, and other data.

In one embodiment, media server 220 may perform a differential backup by querying database 210 to retrieve the first modified page within database 210. Then, media server 220 may query database 210 to retrieve an offset value containing the difference between the page number of the first modified page and the page number of the second modified page within database 210. The media server may query database 210 to retrieve a plurality of offset values, with each offset value containing a difference between page numbers of the modified pages of database 210. After retrieving the plurality of the offsets, media server 220 may then use the offset values to retrieve the plurality of pages that have been modified since the last full backup of database 210.

Additionally, media server 220 may include a granular restore function to add specific objects or records from full database backup file 280 or differential backup file 270 to database 210. The granular restore function may also include a means for selecting one or more records or objects for restoration. In one embodiment, a user interface for selecting and restoring records or objects may be provided as part of a granular restore operation. Granular recovery may enable administrators or users to select only the records or objects needed from the backup copy without having to recover the entire database. In some embodiments, objects may be documents such as Microsoft Word®, Excel®, PowerPoint®, PDF's, video WAV files, and others. In other embodiments, objects may include sites, sub-sites, lists, and list items.

Media server 220 may also read data from full backup file 280 and from differential backup file 270. In one embodiment, media server 220 may retrieve an object or record from either full database backup file 280 or from differential backup file 270. In another embodiment, media server 220 may look at bitmask 260 to determine where the latest object or record resides—either in differential backup file 270 or in full database backup file 280. In various embodiments, media server 220 may store data temporarily in a storage medium as it performs the various functions involved in backing up and restoring data between database 210, full database backup file 280, differential backup file 270, and bitmask 260. Also, media server 220 may access a storage medium using additional interfaces not shown in FIG. 2.

In one embodiment, full database backup file 280 and/or differential backup file 270 are binary files that are sequentially accessed, using standard file I/O calls to the file system of backup storage 250. The file system may be an information system which references and stores data, hierarchically organized in files and directories, in a volume created on backup storage 250.

In some embodiments, full backup database file 280 and/or differential backup file 270 may be structured in block units of memory, also referred to as pages or allocation units. Depending on the type of database 210, the page size may be some multiple of bytes. In one embodiment, database 210 may be a Microsoft SQL Server with a page size of 8 KB. The internal references to memory addresses in database file 280 and/or differential backup file 270 may thus be given in units of pages.

Point in time 261 represents the state of database 210 at a specific point in time at which a differential backup was performed. Media server 220 may create and store bitmask 260 and differential backup file 270 when a differential backup is performed at a specific time corresponding to point in time 261. In one embodiment, bitmask 260 and differential backup file 270 may be saved in the same folder within backup storage 250. Point in time 262 and point in time 263 may correspond to other specific times when differential backups were performed. There may be a differential backup file and bitmask stored for point in times 262 and 263. Any number of bitmasks and differential backup files corresponding to any number of points in time may be stored in backup storage 250. Full database backup file 280 may also correspond to a different point in time (not shown) corresponding to when the last full backup of database 210 was performed.

Each time a differential backup operation is performed, media server 220 may store a differential backup file and a bitmask. In one embodiment, when a new full backup operation is performed, media server 220 may delete the old full database backup file from backup storage 250. Media server 220 may also delete the old bitmasks and differential backup files at that time. In another embodiment, media server 220 may retain one or more prior full database backup files when a new full backup operation is performed. Media server 250 may have a retention policy regarding bitmasks, differential backup files, and full database backup files that involves deleting older files to free up storage space in backup storage 250.

Figure 3:
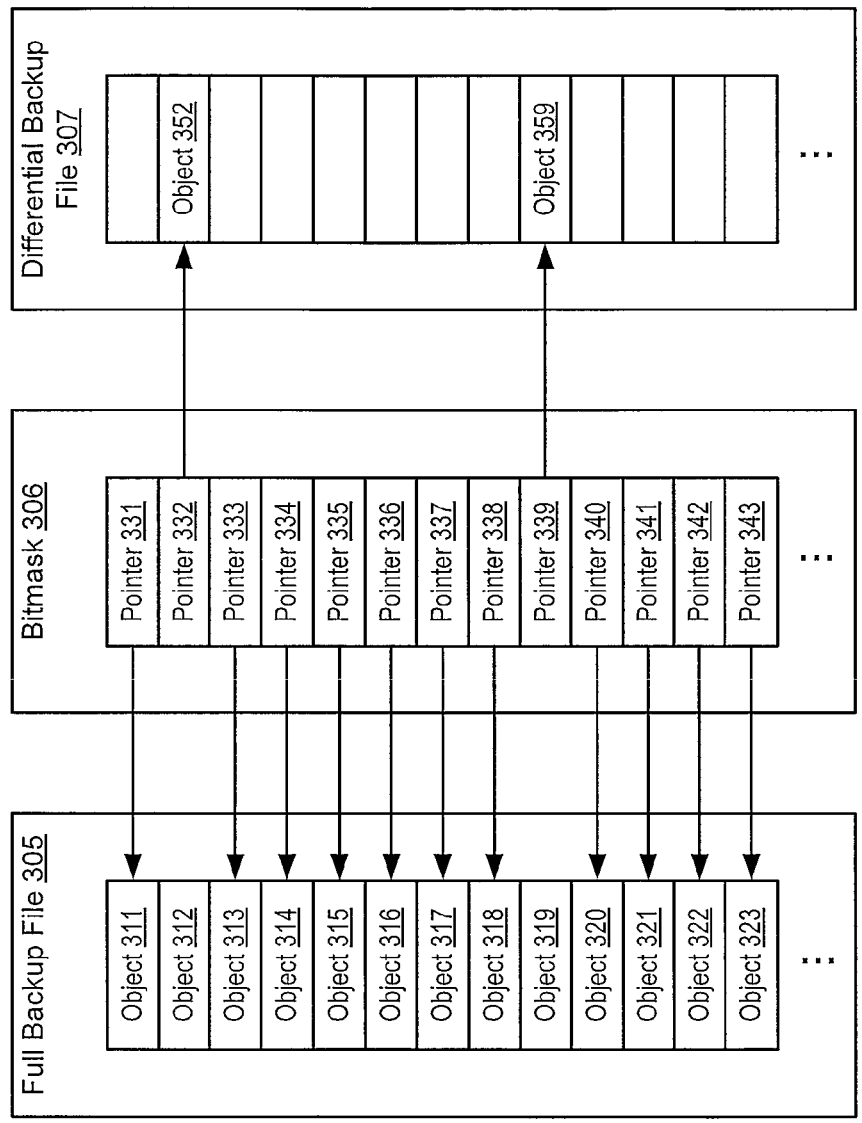
FIG. 3 illustrates one embodiment of a full backup file, bitmask, and differential backup file.

Referring now to FIG. 3, a block diagram of one embodiment of a full backup file 305, bitmask 306, and differential backup file 307 is shown. Full backup file 305 includes objects 311-323 that are representative of any number of stored database objects. Objects 311-323 may be representative of any type of data stored in a database, including tables, records, documents, items, lists, and other data. Differential backup file 307 includes objects 352 and 359 which may be representative of any number of objects that have changed since full backup file 305 was created. Also, the objects displayed in full backup file 305 and differential backup file 307 may comprise objects and metadata describing the objects.

After a database has been stored as a full backup, subsequent backups may be differential backups; a differential backup may store the changes made to the database since the last full backup. The changes contained in the differential backup may be stored in differential backup file 307. Also, when a differential backup is performed, bitmask 306 may be created to indicate which database objects have changed since the last full backup and are stored in differential backup file 307. When performing a restore operation, a restore application may use bitmask 306 to determine whether to pull a specific object from full backup file 305 or from differential backup file 307. In one embodiment, objects may be restored from full backup file 305 and/or differential backup file 307 to the working copy of the database, or to another copy of the database. In another embodiment, objects may be buffered in memory before being restored to the working copy of the database. In a further embodiment, objects may be restored from full backup file 305 and/or differential backup file 307 to a file system on a storage medium, server, client, or other computing device. In a still further embodiment, objects may be restored to an internal portal application or other software application.

Bitmask 306 may be built at least in part using information retrieved from a change map such as the DCM and/or one or more allocation maps. Bitmask 306 may also be built at least in part on information, such as the changed pages and metadata describing the pages, retrieved from a differential backup of a database. The information used to create bitmask 306 may be the changed pages and/or objects and metadata describing the changed pages and/or objects received during a differential backup. Bitmask 306 may be created at the time of a differential backup, or bitmask 306 may be created at the time a restore operation is detected. If bitmask 306 is created when a restore operation is detected, the information needed to create bitmask 306 may be pulled from differential backup file 307. Bitmask 306 may also be built based upon other information retrieved from a database.

In one embodiment, bitmask 306 may be built with pointers to full backup file 305 or to differential backup file 307. In another embodiment, bitmask 306 may store binary data for the objects of the database. For example, bitmask 306 may store a '1' for an object if the object has changed since the last full backup and should be retrieved from the differential backup file 307. Bitmask 306 may store a '0' for an object if the object has not changed since the last full backup and should be retrieved from full backup file 305. In a further embodiment, bitmask 306 may contain Boolean fields having values of TRUE or FALSE to determine whether an object is stored in differential backup file 307 or full backup file 305. Other methods of organizing bitmask 306 are possible and contemplated.

The illustrations of full backup file 305, bitmask 306, and differential backup file 307 in FIG. 3 are logical representations of these files. The actual structure and organization of these files may be different from how they appear in FIG. 3. For example, additional data may be appended to the end of differential backup file 307. If data is added to the database after full backup file 305 was created, the new data may be added to the end of differential backup file 307. In addition, pointers or binary data may be added to the end of bitmask 306 that corresponds to the new data. Also, if objects are deleted from the database after full backup file 305 was created, metadata describing the deleted objects may be appended to differential backup file 307, and pointers or binary data corresponding to the deleted data may be appended to bitmask 306.

The methods and mechanisms described herein may also be used with incremental backups. Generally speaking, an incremental backup may store all of the changes to a database since the last incremental backup or the last full backup. For example, a full backup may be performed, and then any number of incremental backups may be performed. Metadata from each of the incremental backups may be merged with the full backup metadata as described above. Alternatively, the incremental backup metadata may me merged together into a single file which may then be merged with the full backup metadata. The merging together of all of the incremental backups metadata into a single file may create a file similar to a differential backup file. The single merged file may need to be reformatted or organized in a different way to match up with the format of a differential backup file. A bitmask may be generated from the metadata describing the data in the single file, similar to how a bitmask may be generated from a stored differential backup file, and then the merged file may take the place of the differential backup file in the methods described herein. Using the above described method, a granular restore operation may be performed following one or more incremental backups of a database. As used herein, a "partial backup" may refer to either a differential or an incremental backup.

Figure 4:
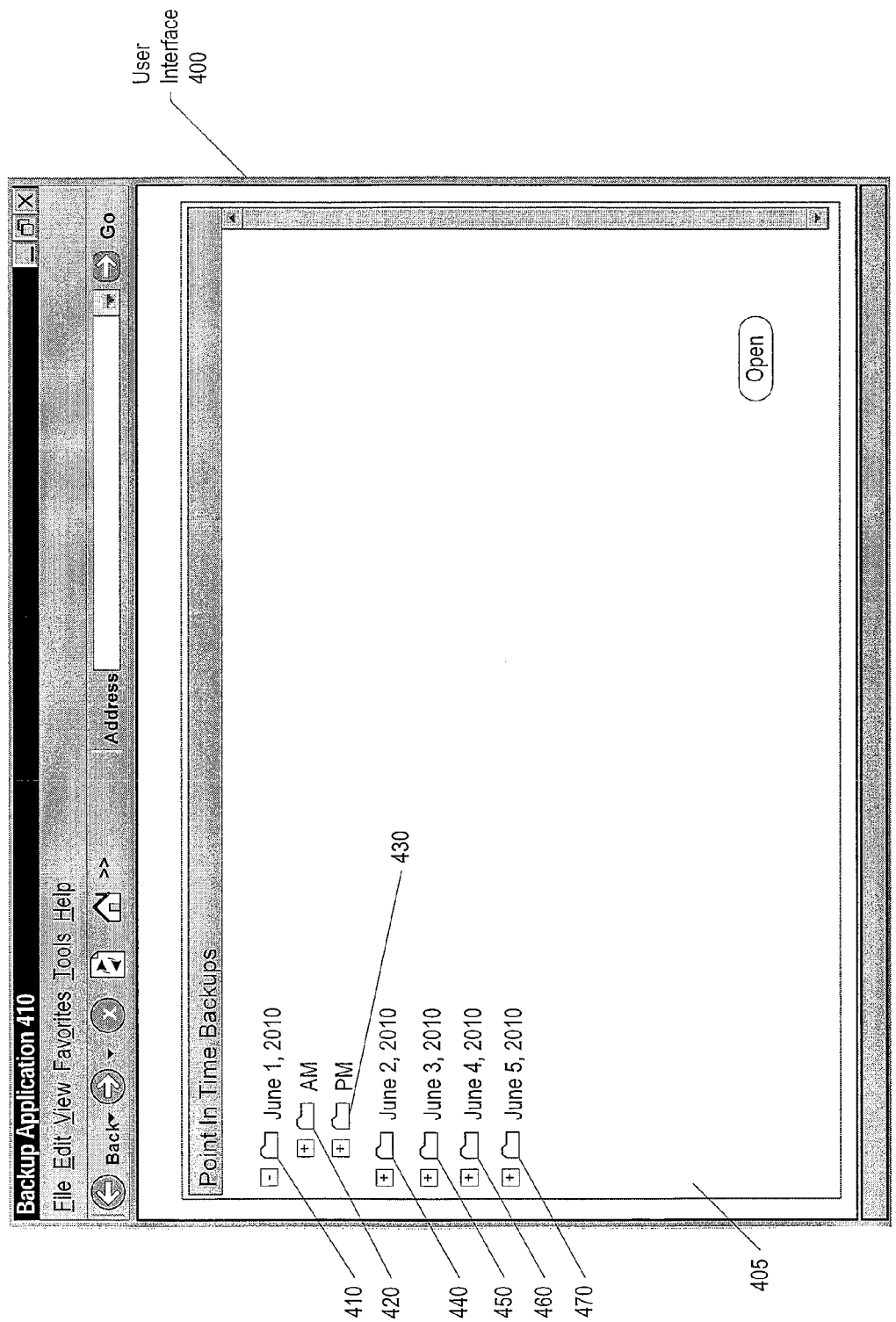
FIG. 4 illustrates one embodiment of a user interface for selecting from a list of database archives.

Referring now to FIG. 4, one embodiment of a user interface 400 that may be presented by a backup application for selecting from a list of database archives is illustrated. Backup application 410 may run on a media server, database server, client computer, or other computing device. Backup application 410 may present user interface 400 to a user to access and select from a plurality of stored point in time backups of a database. User interface 400 may include features such as drop-down menus, a navigation bar, an address field, and other common features of web pages and graphical user interfaces (GUIs). The user may be an administrator, software developer, or other user. The user may wish to restore one or more objects from a backup copy of a database from a specific point in time. Alternatively, the user may wish to restore the entire database from a specific point in time. As depicted in FIG. 4, user interface 400 may display a plurality of backups for the user to select from when considering a restore operation. The point in time backups may be listed according to the date or time on which the backups were performed. Other methods of listing and organizing the point in time backups are possible and contemplated.

The following backups are displayed in the "Point In Time Backups" pane 405 of user interface 400: Jun. 1, 2010 backup 410, the morning or AM backup of June 1 (420), the afternoon or PM backup of June 1 (430), June 2 backup 440, June 3 backup 450, June 4 backup 460, and June 5 backup 470. Any of the specific days displayed in the Point in Time Backups pane 405 may have multiple backups for that specific day. The backups displayed in the Point in Time Backups pane 405 are representative of any number of backups which may be displayed as part of a user interface 400 of a backup application 410.

The user may search the list in Point in Time Backups pane 405 for a specific point in time backup from which to restore objects. The backup that was performed at that specific point in time may have been a full or a differential backup. In one embodiment, the pane 405 may not differentiate between a backup coming from a full backup or a differential backup. In another embodiment, Point in Time Backups pane 405 may display different shading for full backups versus differential backups, or give an indication so that the user may see which type of backup was performed at the point in time. In either case, the user may not need to know if the backup for a specific point in time was a full or differential; the user may restore objects from a specific point in time without that knowledge. After the user has selected the specific point in time backup from which to restore objects, the user may select the "open" button to expand the backup to see the objects of the database as they existed at that point in time. User interface 400 may take on other forms or display point in time backups in other formats than the one shown in FIG. 4.

Figure 5:
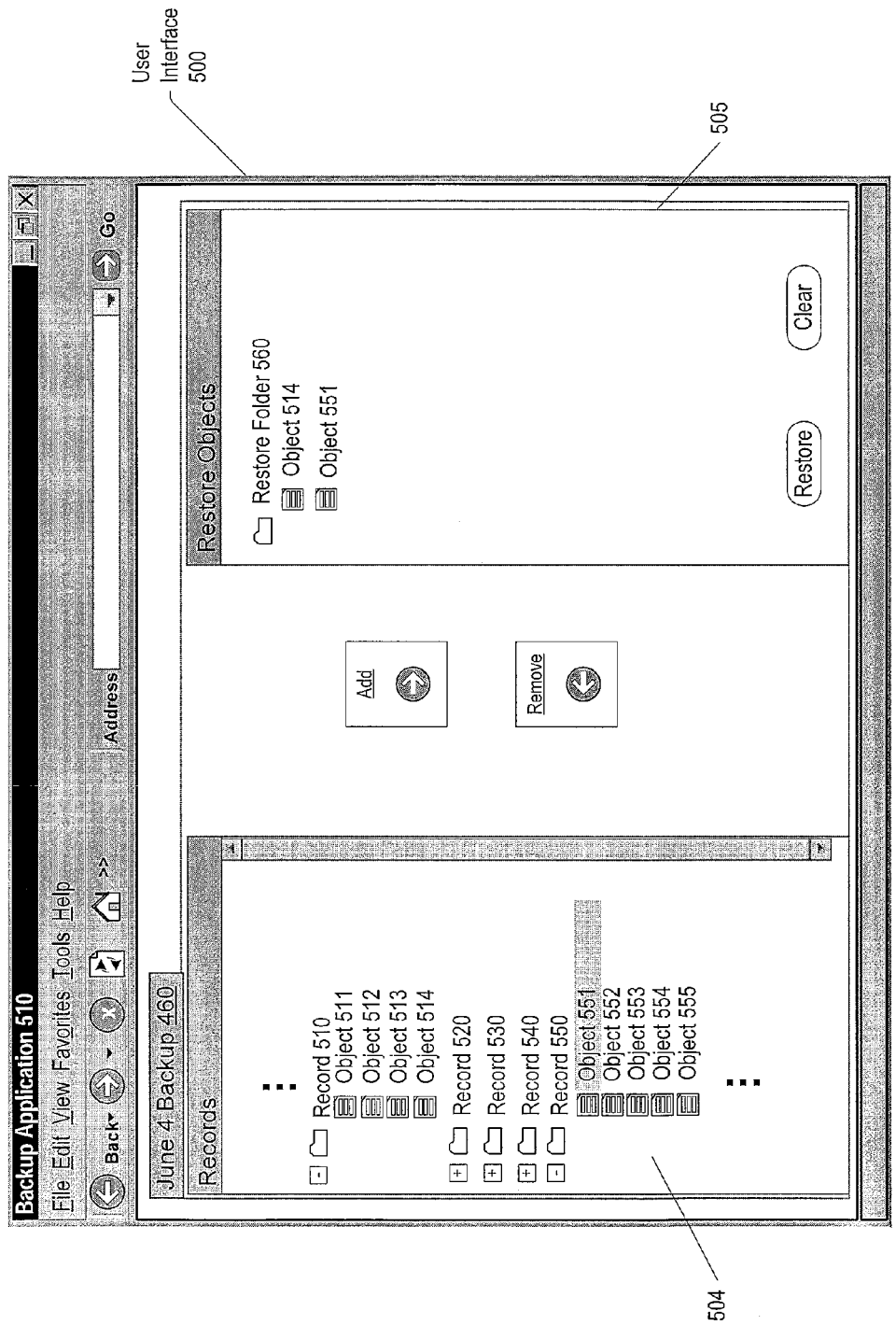
FIG. 5 illustrates one embodiment of a user interface for selecting specific records or objects to be restored.

Turning now to FIG. 5, one embodiment of a user interface 500 that may be presented by backup application 510 for selecting specific records or objects to be restored is illustrated. User interface 500 may include features such as drop-down menus, a navigation bar, an address field, and other common features of web pages and GUIs. User interface 500 is presented for discussion purposes only; other representations of user interfaces are possible and contemplated. In another embodiment, user interface 500 may show other types of objects, such as sites, subsites, lists and/or items, which may be selected for restoration. In FIG. 5, user interface 500 shows a view of how the records and objects may be presented from a specific point in time backup; in this case, the specific point in time backup is June 4 Backup 460. June 4 backup 460 may have been selected on a previous user interface, such as the one shown in FIG. 4, where a plurality of point in time backups are presented to a user.

A hierarchical listing of records and objects may be presented in a "Records" pane 504 in user interface 500. Record 510 is displayed in Records pane 504, as are objects 511-514 of record 510. Records 520, 530, 540, and 550 are also displayed in Records pane 504, and objects 551-55 appear under the listing for record 550. The listing shown in Records pane 504 may only be a portion of the records and objects stored in the June 4 backup 460 of a database. The entries of June 4 backup 460 may have been traversed to reach the records and objects displayed in user interface 500. Records and objects may be selected from the listing in Records pane 504 and added to the "Restore Objects" pane 505 by using an Add button. Records and objects may be selected and removed from the Restore Objects pane 505 by using a Remove button. As is shown in FIG. 5, objects 514 and 551 appear under the restore folder 560 in Restore Objects pane 505, indicating that objects 514 and 551 have been selected by a user for restoration.

In one embodiment, the view shown in user interface 500 may be created by merging metadata from a full database backup file with metadata from a differential backup file corresponding to the point in time backup of June 4. In this sense, the view may be considered a "synthetic full backup view" to the extent it presents a view of a full backup as it would appear had it been performed instead of the point in time backup of June 4 (i.e., the partial backup). In another embodiment, the view shown in user interface 500 may be created by logically merging a differential backup file with a last full backup file. In a further embodiment, a bitmask may be used to generate the view shown in user interface 500. The view of user interface 500 is a virtual representation of the underlying data structure of a database at a specific point in time. A map that translates objects to pages and pages to objects may also be used to present the view of user interface 500. User interface 500 displays objects, and a differential backup file, bitmask, and full database backup file may be organized according to pages. A translation map may be used to convert the page structure of the backup files into the object view of user interface 500. A translation map may also be used to find the objects selected for restoration by a user in user interface 500 within the page structure of a differential backup file and a full database backup file.

A differential backup file, a last full backup file, and/or a bitmask may be loaded from backup storage to the physical memory of a media server to present the view shown in FIG. 5, and the files may stay in memory to allow for objects to be quickly retrieved after the user selects objects for restoration.

The view of June 4 backup 460 shown in user interface 500 of FIG. 5 may show the database as it existed at the time the differential backup was performed on June 4. In other embodiments, different types of views may be presented by user interface 500. For example, if the database stores a website, user interface 500 may present a view of the website as it looked at a specific point in time in the past.

Figure 6:
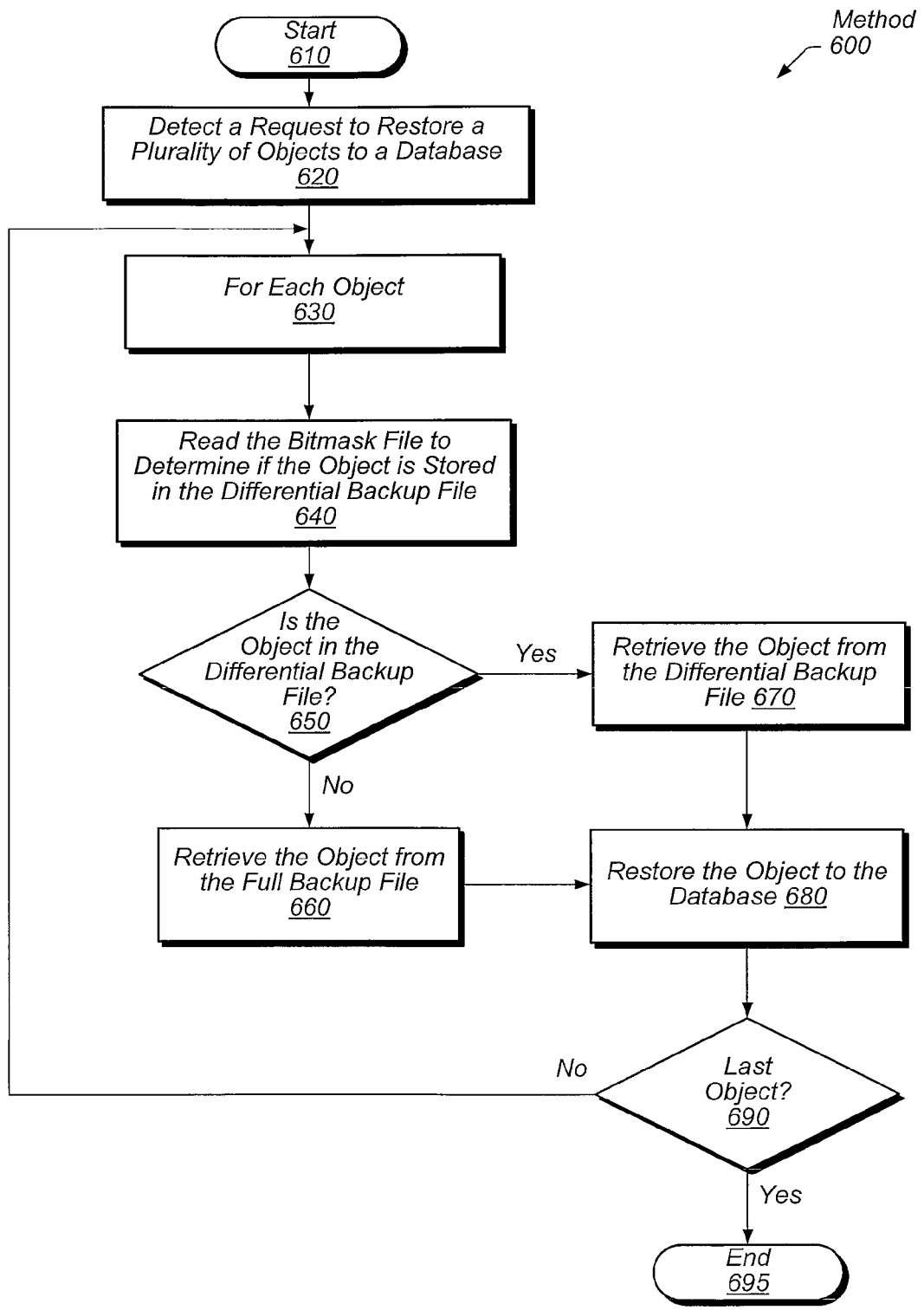
FIG. 6 is a generalized flow diagram illustrating one embodiment of a method for restoring a plurality of objects to a database.

Referring now to FIG. 6, an embodiment of a method 600 for restoring a plurality of objects to a database is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

The method 600 starts in block 610, and then a request to restore a plurality of objects to a database is detected in block 620. Next, for each object (block 630), the following steps may be performed. In block 640, the bitmask file may be read to determine if the object is stored in the differential backup file. If the object is in the differential backup file (conditional block 650), then the object may be retrieved from the differential backup file (block 670). If the object is not in the differential backup file (conditional block 650), then the object may be retrieved from the full backup file (block 660). After block 660 or block 670, the object may be restored to the database (block 680). Next, if the object restored in block 680 is the last object (conditional block 690), then the method 600 may end in block 695. If it is not the last object (conditional block 690), then the method 600 may return to block 630 to restore the next object.

Figure 7:
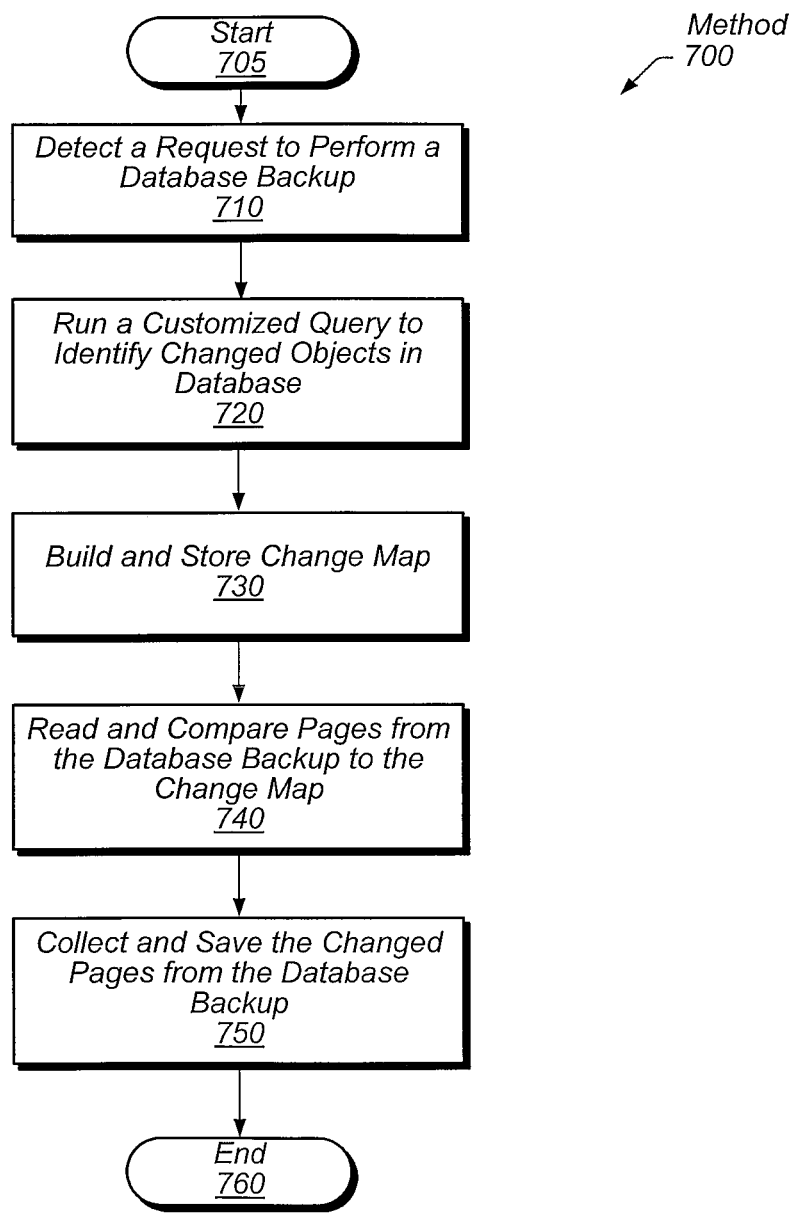
FIG. 7 is a generalized flow diagram illustrating one embodiment of a method for performing a differential backup.

Turning now to FIG. 7, an embodiment of a method 700 for performing a differential backup is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

The method 700 starts in block 705, and then a request to perform a database backup may be detected (block 710). Next, a customized query may be run to find and retrieve a change map from the database (block 720). In one embodiment, the change map may be a differential changed map (DCM). Next, the change map may be stored by a backup application (block 730). Then, the pages from the database backup may be read and compared to the stored change map (block 740). Next, the pages containing changes as indicated by the change map may be collected and saved as a differential backup file (block 750). After block 750, the method 700 may end in block 760. In this method, a full backup may be performed from the client's point of view, but a media server may only store the changes to the database as if a differential backup were performed.

It is noted that the above-described embodiments may comprise software. In such an embodiment, program instructions and/or a database (both of which may be referred to as "instructions") that represent the described systems and/or methods may be stored on a computer readable storage medium. Generally speaking, a computer readable storage medium may include any storage media accessible by a computer during use to provide instructions and/or data to the computer. For example, a computer readable storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM)), ROM, Flash memory, non-volatile memory (e.g. Flash memory) accessible via a peripheral interface such as the USB interface, etc. Storage media may include micro-electro-mechanical systems (MEMS), as well as storage media accessible via a communication medium such as a network and/or a wireless link.

In various embodiments, one or more portions of the methods and mechanisms described herein may form part of a cloud computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although several embodiments of approaches have been shown and described, it will be apparent to those of ordinary skill in the art that a number of changes, modifications, or alterations to the approaches as described may be made. Changes, modifications, and alterations should therefore be seen as within the scope of the methods and mechanisms described herein. It should also be emphasized that the above-described embodiments are only non-limiting examples of implementations.

What is claimed is:

1. A method of performing a granular restore operation to a database, the method comprising:

detecting a request to restore a database;

identifying a full backup of the database, wherein the full backup corresponds to a state of the database at a first time;

identifying a partial backup of the database, wherein the partial backup corresponds to a state of the database at a second time later than the first time;

presenting at least a portion of a synthetic full backup view of the database based upon the full backup and the partial backup, wherein the synthetic full backup view corresponds to the second time;

detecting user input to the synthetic full backup view selecting a plurality of objects to be restored to respective states corresponding to the second time, wherein the selected plurality of objects includes a first object, wherein a most recent version of the first object corresponding to the second time is stored in the partial backup, wherein an older version of the first object corresponding to the first time is stored in the full backup;

for each respective object of the selected plurality of objects, determining a corresponding backup from which to restore the respective object, wherein the corresponding backup is either the full backup or the partial backup, wherein said determining comprises determining that the most recent version of the first object should be restored from the partial backup and determining that one or more other objects of the selected plurality of objects should be restored from the full backup; and for each respective object of the selected plurality of objects, restoring the respective object from the corresponding backup determined for the respective object, wherein said restoring comprises restoring the most recent version of the first object from the partial backup and restoring the one or more other objects from the full backup.

2. The method as recited in claim 1, wherein said presenting the synthetic full backup view comprises:
accessing metadata associated with the full backup;
accessing metadata associated with the partial backup; and
presenting a synthetic full backup view of the database based upon a merger of the metadata associated with the full backup and the metadata associated with the partial backup.

3. The method as recited in claim 1, wherein prior to detecting the request to perform the restore operation the method comprises:
performing a full backup of the database and storing data received from the full backup; and
performing a partial backup of the database, wherein performing a partial backup comprises:
detecting a request to perform a partial backup of the database;
storing data received from the partial backup;
building a bitmask file including indicators that specify which objects in the database have been modified subsequent to the full backup and are stored as part of the partial backup; and
storing the bitmask file.

4. The method as recited in claim 1, further comprising creating the partial backup, wherein said creating the partial backup comprises:
detecting a request to perform a backup of the database;
initiating a backup procedure;
running a customized query on the database to identify changed objects in the database since a last full backup;
storing a change map that identifies the changed objects;
receiving a plurality of data objects during the backup procedure;
comparing objects of the plurality of data objects to objects identified in the change map;
saving particular objects of the plurality of data objects as part of the partial backup, in response to determining the change map indicates the particular objects have changed.

5. The method as recited in claim 3, wherein said determining the corresponding backup from which to restore a respective object comprises comparing an identifier included in a header associated with the object to identifiers stored in the bitmask file.

6. The method as recited in claim 3, wherein the bitmask file is generated based upon data in an SQL server.

7. The method as recited in claim 1, wherein the database comprises a content database including website content.

8. A non-transitory computer readable storage medium comprising program instructions for performing a granular restore operation, wherein when executed by a computer system, the program instructions are operable to:
detect a request to restore a database;
identify a full backup corresponding to the database, wherein the full backup corresponds to a state of the database at a first time;
identify a partial backup corresponding to the database, wherein the partial backup corresponds to a state of the database at a second time later than the first time;
present at least a portion of a synthetic full backup view of the database based upon the full backup and the partial backup, wherein the synthetic full backup view corresponds to the second time;
detect user input to the synthetic full backup view selecting a plurality of objects to be restored to respective states corresponding to the second time, wherein the selected plurality of objects includes a first object, wherein a most recent version of the first object corresponding to the second time is stored in the partial backup, wherein an older version of the first object corresponding to the first time is stored in the full backup;
for each respective object of the selected plurality of objects, determine a corresponding backup from which to restore the respective object, wherein the corresponding backup is either the full backup or the partial backup, wherein said determining comprises determining that the most recent version of the first object should be restored from the partial backup and determining that one or more other objects of the selected plurality of objects should be restored from the full backup; and
for each respective object of the selected plurality of objects, restore the respective object from the corresponding backup determined for the respective object, wherein said restoring comprises restoring the most recent version of the first object from the partial backup and restoring the one or more other objects from the full backup.

9. The non-transitory computer readable storage medium as recited in claim 8, wherein when executed the program instructions are further operable to:
access metadata associated with the full backup;
access metadata associated with the partial backup; and
present the synthetic full backup view of the database based upon a merger of the metadata associated with the full backup and the metadata associated with the partial backup.

10. The non-transitory computer readable storage medium as recited in claim 8, wherein prior to detecting a request to perform a granular restore operation the program instructions are further operable to:
perform a full backup of the database and storing data received from the full backup; and
perform a partial backup of the database, wherein performing a partial backup comprises:
detect a request to perform a partial backup of the database;
store data received from the partial backup;
build a bitmask file including indicators that specify which objects in the database have been modified subsequent to the full backup and are stored as part of the partial backup; and
store the bitmask file.

11. The non-transitory computer readable storage medium as recited in claim 8, wherein when executed the program instructions are further operable to create the partial backup, wherein said creating the partial backup comprises:
detect a request to perform a backup of the database;
initiate a backup procedure;
run a customized query on the database to identify changed objects in the database since a last full backup;
store a change map that identifies the changed objects;
receive a plurality of data objects during the backup procedure;
compare objects of the plurality of data objects to objects identified in the change map;

save particular objects of the plurality of data objects as part of the partial backup, in response to determining the change map indicates the particular objects have changed.

12. The non-transitory computer readable storage medium as recited in claim 10, wherein in said determining the corresponding backup from which to restore a respective object the program instructions are operable to compare an identifier included in a header associated with the object to identifiers stored in the bitmask file.

13. The non-transitory computer readable storage medium as recited in claim 8, wherein the bitmask file is retrieved from an SQL server.

14. The non-transitory computer readable storage medium as recited in claim 8, wherein the database comprises a content database including website content.

15. A computing system for performing a granular restore operation, the system comprising:
   one or more processors; and
   memory storing program instructions, wherein the program instructions are executable by the one or more processors to:
      detect a request to restore a database;
      identify a full backup corresponding to the database, wherein the full backup corresponds to a state of the database at a first time;
      identify a partial backup corresponding to the database, wherein the partial backup corresponds to a state of the database at a second time later than the first time;
      present at least a portion of a synthetic full backup view of the database based upon the full backup and the partial backup, wherein the synthetic full backup view corresponds to the second time;
      detect user input to the synthetic full backup view selecting a plurality of objects to be restored to respective states corresponding to the second time, wherein the selected plurality of objects includes a first object, wherein a most recent version of the first object corresponding to the second time is stored in the partial backup, wherein an older version of the first object corresponding to the first time is stored in the full backup;
      for each respective object of the selected plurality of objects, determine a corresponding backup from which to restore the respective object, wherein the corresponding backup is either the full backup or the partial backup, wherein said determining comprises determining that the most recent version of the first object should be restored from the partial backup and determining that one or more other objects of the selected plurality of objects should be restored from the full backup; and
      for each respective object of the selected plurality of objects, restore the respective object from the corresponding backup determined for the respective object, wherein said restoring comprises restoring the most recent version of the first object from the partial backup and restoring the one or more other objects from the full backup.

16. The computer system as recited in claim 15, wherein the program instructions are further executable by the one or more processors to:
   access metadata associated with the full backup;
   access metadata associated with the partial backup; and
   present the synthetic full backup view of the database based upon a merger of the metadata associated with the full backup and the metadata associated with the partial backup.

17. The computer system as recited in claim 15, wherein prior to detecting a request to perform a granular restore operation, the program instructions are further executable by the one or more processors to:
   perform a full backup of the database and storing data received from the full backup; and
   perform a partial backup of the database, wherein performing a partial backup comprises:
      detect a request to perform a partial backup of the database;
      store data received from the partial backup;
      build a bitmask file including indicators that specify which objects in the database have been modified subsequent to the full backup and are stored as part of the partial backup; and
      store the bitmask file.

18. The computer system as recited in claim 15, wherein the program instructions are further executable by the one or more processors to create the partial backup, wherein in said creating the program instructions are executable by the one or more processors to:
   detect a request to perform a backup of the database;
   initiate a backup procedure;
   run a customized query on the database to identify changed objects in the database;
   store a change map that identifies the changed objects;
   receive a plurality of data objects during the backup procedure;
   compare objects of the plurality of data objects to objects identified in the change map;
   save objects of the plurality of data objects that are identified as having changed; and
   discard objects of the plurality of data objects that are not identified as having changed.

19. The computer system as recited in claim 17, wherein in said determining the corresponding backup from which to restore a respective object the program instructions are executable by the one or more processors to compare an identifier included in a header associated with the object to identifiers stored in the bitmask file.

20. The computer system as recited in claim 15, wherein the database comprises a content database including website content.

* * * * *